US008260059B2

(12) United States Patent
Hofhauser et al.

(10) Patent No.: US 8,260,059 B2
(45) Date of Patent: Sep. 4, 2012

(54) SYSTEM AND METHOD FOR DEFORMABLE OBJECT RECOGNITION

(75) Inventors: Andreas Hofhauser, Furstenfeldbruck (DE); Carsten Steger, Eching (DE)

(73) Assignee: MVTec Software GmbH, Munich (DE)

( * ) Notice: Subject to any disclaimer, the term of this patent is extended or adjusted under 35 U.S.C. 154(b) by 1157 days.

(21) Appl. No.: 12/115,059

(22) Filed: May 5, 2008

(65) Prior Publication Data

US 2009/0185715 A1    Jul. 23, 2009

(30) Foreign Application Priority Data

Jan. 18, 2008 (EP) ..................................... 08150403

(51) Int. Cl.
*G06K 9/00* (2006.01)
*G06K 9/62* (2006.01)

(52) U.S. Cl. .......................... 382/215; 382/154; 345/419

(58) Field of Classification Search .................. 382/154, 382/215–218, 240, 285; 345/419–427; 356/12–14; 348/42–60; 359/462–477
See application file for complete search history.

(56) References Cited

U.S. PATENT DOCUMENTS

| 6,005,978 | A  | 12/1999 | Garakani        |
| 6,324,299 | B1 | 11/2001 | Sarachik et al. |
| 6,411,734 | B1 | 6/2002  | Bachelder et al.|
| 6,993,177 | B1 | 1/2006  | Bachelder       |
| 7,062,093 | B2 | 6/2006  | Steger          |
| 7,190,834 | B2 | 3/2007  | Davis           |
| 7,239,929 | B2 | 7/2007  | Ulrich et al.   |
| 2002/0057838 | A1 | 5/2002 | Steger        |
| 2005/0018904 | A1 | 1/2005 | Davis         |

FOREIGN PATENT DOCUMENTS

| EP | 1193642   | 4/2002 |
| EP | 1 126 414 | 9/2003 |
| EP | 1 394 727 | 3/2004 |
| JP | 3776340   | 5/2002 |

OTHER PUBLICATIONS

Horn, Projective Geometry considered Harmful, 1999, 15 pp.
Bookstein, "Principal Warps: Thin-plate Splines and the Decomposition of Deformations," IEEE Transactions on pattern analysis and machine intelligence, vol. 11, No. 6, 567-585, 1989.
Shi et al., Normalized cuts and image segmentation. In IEEE Conference on Computer Vision and Pattern Recognition, pp. 731-737, 1997.
Jain et al., "Object Matching Using Deformable Templates," IEEE Transactions on Pattern Analysis and Machine Intelligence 18(3): 267-278, Mar. 1996.

(Continued)

*Primary Examiner* — Aaron W Carter
(74) *Attorney, Agent, or Firm* — Kagan Binder, PLLC

(57) ABSTRACT

The present invention provides a system and method for detecting deformable objects in images even in the presence of partial occlusion, clutter and nonlinear illumination changes. A holistic approach for deformable object detection is disclosed that combines the advantages of a match metric that is based on the normalized gradient direction of the model points, the decomposition of the model into parts and a search method that takes all search results for all parts at the same time into account. Despite the fact that the model is decomposed into sub-parts, the relevant size of the model that is used for the search at the highest pyramid level is not reduced. Hence, the present invention does not suffer the speed limitations of a reduced number of pyramid levels that prior art methods have.

19 Claims, 8 Drawing Sheets

OTHER PUBLICATIONS

Brown, "A survey of image registration techniques," ACM Computing Surveys 24(4): 325-376, Dec. 1992.

Tanimoto, "Template matching in pyramids," Computer Graphics and Image Processing 16: 356-369, 1981.

International Search Report dated Feb. 18, 2009 for European Patent application 08150403.7.

Toru Wakahara: "Online-Handwritten Character Recognition Using Local Affine Transformation", Systems & Computers in Japan, Jul. 1, 1989, pp. 10-19, vol. 20, No. 7, Wiley, Hoboken, NJ, US.

Feldmar J. and Ayache N.: "Rigid, Affine and Locally Affine Registration of Free-Form Surfaces", International Journal of Computer Vision, May 1, 1996, pp. 99-199, vol. 18(2), Kluwer Academic Publishers, Norwell, US.

Allezard N. et al: "Recognition of 3D Textured Objects by Mixing View-Based and Model-Based Representations", Pattern Recognition, 2000. Proceedings 15th International Conference on Sep. 3-7, 2000; [Proceedings of the International Conference on Pattern Recognition. (ICPR)] pp. 960-963, vol. 1, IEEE Computer. Soc., Los Alamitos, CA, USA.

Dementhon, D.F. and Davis, L.S.: "Model-Based Object Pose in 25 Lines of Code", International Journal of Computer Vision, pp. 123-141, vol. 15, No. 1, 1995, Kluwer Academic Publishers, Boston, MA, US.

Lowe, D.G.: "Object Recognition From Local Scale-Invariant Features", Computer Vision 1999. [The proceedings of the 7th IEEE International Conference on Kerkyra, Greece, Sep. 20-27, 1999, pp. 1150-1157, vol. 2 , Sep. 20, 1999, IEEE Computer Soc., Los Alamitos, CA, USA.

SYSTEM AND METHOD FOR DEFORMABLE OBJECT RECOGNITION

CROSS REFERENCE TO RELATED APPLICATION

This application claims priority to EP Application No. 08 15 0403.7, entitled "System and Method for Deformable Object Recognition," filed Jan. 18, 2008, which is incorporated herein by reference in its entirety.

FIELD OF THE INVENTION

This invention relates generally to machine vision systems, and more particularly, to visual recognition of nonlinearly transformed objects under partial occlusion, clutter, or nonlinear contrast changes.

BACKGROUND OF THE INVENTION

The fast, robust, and accurate localization of a given 2D object template in images is the natural prerequisite for numerous computer vision and particularly machine vision applications. For example, for pick and place applications, an object recognition method must determine the location of the object that is imaged. Given its location in conjunction with the known geometry of the imaging device, a pose of the object can be calculated by methods that are well known in the art. Given this pose, a robot can grasp the object from, e.g., a conveyor belt. In various inspection tasks extracting the location of an object allows for the un-warping of the found region in the image and facilitates optical character recognition (OCR) or a comparison with a prototype image for, e.g., detection of possible manufacturing errors.

Several methods have been proposed in the art to determine the position of an object in an image. Most of the methods compare a similarity between a set of possible object poses and the image. Positions that exceed a threshold and are local maxima with respect to this similarity measure are chosen as the location of the object.

Depending on the similarity measure that is used, a certain invariance against adverse imaging conditions is achieved. For instance, with normalized correlation as the similarity measure, invariance against linear gray value changes between the model image and the search image is achieved. Particularly relevant for the present invention is a similarity measure that is invariant against partial occlusion, clutter, and nonlinear contrast changes, incorporated herein by reference (U.S. Pat. No. 7,062,093, EP 1193642, and JP 3776340). The general idea of said metric is to use the dot product of the normalized directions of image and model features as the measure of similarity between a model and the image.

Typically, an exhaustive search over all pose parameters is computationally very expensive and prohibitive for most real-time applications. Most of the prior art methods overcome this speed limitation by building an image pyramid from both the model and the search image (see e.g., Tanimoto (1981) [Steven L. Tanimoto Template matching in pyramids. Computer Graphics and Image Processing, 16:356-369, 1981], or Brown (1992) [Lisa Gottesfeld Brown. A survey of image registration techniques. *ACM Computing Surveys*, 24(4):325-376, December 1992.]). Then the similarity measure is evaluated for the full search range only at the highest pyramid level. At lower levels, only promising match candidates are tracked until the lowest pyramid level is reached. Here, the number of pyramid levels that are used is a critical decision that directly influences the runtime of the object recognition method.

Typically, the number of pyramid levels is selected based on the minimal size of the object in the highest pyramid image. If the object is very small in that image, it is hard to discriminate the object from, e.g., clutter. Then too many possible match candidates must be evaluated. If not enough pyramid levels are chosen, the search on the highest pyramid level is prohibitively slow.

Another way to speed up the search is to assume that the motion parameters of the object under inspection can be approximated by a linear affine transformation. A linear affine transformation maps input points $(x, y)^T$ to output points $(x', y')^T$ according the formula:

$$\begin{pmatrix} x' \\ y' \end{pmatrix} = \begin{pmatrix} a_{11} & a_{12} \\ a_{21} & a_{22} \end{pmatrix}\begin{pmatrix} x \\ y \end{pmatrix} + \begin{pmatrix} t_x \\ t_y \end{pmatrix}.$$

This general formula can be decomposed further into a geometrically more meaningful parameterization $$\begin{pmatrix} x' \\ y' \end{pmatrix} = \begin{pmatrix} \cos\varphi & -\sin\varphi \\ \sin\varphi & \cos\varphi \end{pmatrix}\begin{pmatrix} 1 & -\sin\theta \\ 0 & \cos\theta \end{pmatrix}\begin{pmatrix} s_x & 0 \\ 0 & s_y \end{pmatrix}\begin{pmatrix} x \\ y \end{pmatrix} + \begin{pmatrix} t_x \\ t_y \end{pmatrix}.$$

The parameters then describe a scaling of the original x and y axes by different scaling factors $s_x$ and $s_y$, a skew transformation of the y axis with respect to the x axis, i.e., a rotation of the y axis by an angle $\theta$, while the x axis is kept fixed, a rotation of both axes by an angle $\varphi$, and finally a translation by a vector $(t_x, t_y)^T$. Typically, an object recognition system evaluates these parameters only for a reduced subset, e.g., only translation and rotation. Furthermore, the parameters are restricted to a certain fixed range, e.g., a reduced rotation range. This reduces the space of possible poses that an object recognition system must check on the highest pyramid level and hence speeds up the search.

However, in various situations the object that must be found is transformed according to a more general transformation than a linear affine transformation or a subset thereof. One such transformation is the perspective transformation that describes a mapping of a planar object that is imaged from different camera positions according to the formula:

$$\begin{pmatrix} x' \\ y' \\ t' \end{pmatrix} = \begin{pmatrix} p_{11} & p_{12} & p_{13} \\ p_{21} & p_{22} & p_{23} \\ p_{31} & p_{32} & p_{33} \end{pmatrix}\begin{pmatrix} x \\ y \\ t \end{pmatrix}$$

(see Hartley and Zisserman (2000) [Richard Hartley and Andrew Zisserman, Multiple View Geometry in Computer Vision. Cambridge University Press, 2000]). The nine parameters are defined up to scale, resulting in 8 degrees of freedom.

We distinguish explicitly between the case were the final task of the object recognition system is to only rectify an image and the case that the pose of the object must be determined. For the former, it is enough to determine the perspective transformation. Here, the inverted perspective transformation is used to rectify the image.

For the case that the 3D pose of the object must be determined, and the internal parameters of the camera are provided, only 6 degrees of freedom suffice to describe the pose (3 for the translation and 3 for the rotation). It is important to note that a perspective transformation cannot always be directly transformed into a pose, because additionally two nonlinear constrains must be enforced for the 8 parameters of the perspective transformation in order to result into real poses (Berthold K. P. Horn, Projective Geometry considered Harmful, 1999). Once a valid perspective transformation is found, it can be decomposed directly into a 3D pose by methods known in the art (e.g., Oliver Faugeras, Three-dimensional computer vision: a geometric viewpoint. The MIT Press, 2001, chapter 7.5). A preferred way is to directly search for the 3D pose parameters and not to first determine a perspective transformation and then decompose it into a pose.

Another example where a linear transformation does not suffice is when the image of the object is deformed nonlinearly. This might be due to a distortion induced by the camera lens system that cannot be corrected beforehand. A further example is when the imaging is performed in a medium that produces irregular distortions like hot air or images taken under water. Another source of nonlinear transformation is when the object itself is deformable, e.g. when it is printed on a surface that is bent or wrinkled. Here, not only the pose, but also the deformation of the model must be determined simultaneously. A mathematical description for a non-rigid deformation is to add a warping $W(x,y)$ so that points are transformed according to the formula:

$$\begin{pmatrix} x' \\ y' \end{pmatrix} = W(x, y) + \begin{pmatrix} a_{11} & a_{12} \\ a_{21} & a_{22} \end{pmatrix} \begin{pmatrix} x \\ y \end{pmatrix} + \begin{pmatrix} t_x \\ t_y \end{pmatrix}.$$

If $$W(x, y) = \sum_{i=1}^{n} w_i U(|P_i - (x, y)|)$$

and $U(r) = r^2 \log r^2$, the well-known thin-plate-spline function (Fred L. Bookstein, "Principal Warps: Thin-plate Splines and the Decomposition of Deformations", IEEE Transactions on pattern analysis and machine intelligence, Vol 11, No. 6, 567-585 1989) is obtained. Here, the warp is parameterized by anchor points $P_i$ and coefficients $w_i$. The resulting warp minimizes the curvature between the anchor points.

Most prior art approaches for nonlinear object recognition make an assumption that even if the whole object is deformed, sufficiently small parts of the model remain fairly similar in an image, even after a deformation.

However, it is an open question how to incorporate this assumption into an efficient search method of an object recognition system. One approach (see, e.g., U.S. Pat. No. 7,239, 929 or U.S. Pat. No. 7,190,834) consists of organizing the decomposed parts of the model hierarchically. Here, one part is selected as a root part of the subdivision. Starting from this root part, the other objects are organized in a tree-like structure. It is important to note that in the subsequent search this root object is detected alone. Once this root part is detected, the possible locations of the subsequent parts are narrowed down based on the assumptions of the deformation of the object. The search for the other parts is consequently simplified.

However, there are several evident problems with this prior art approach. One is that searching for a part is typically less discriminative than a search for the whole object because a part contains by definition less information. This leads to spurious matches and to a reduced search speed because more match hypotheses must be evaluated. A further limitation is that the size of a part is smaller than that of the whole model and accordingly only a smaller number of pyramid levels can be used before the relative size of the model in the image becomes too small to be used by a feature-based search method.

The aim of the present invention is a holistic approach for deformable object detection that combines the advantages of the said invariant match metric, the decomposition of the model into parts, and a search method that takes all search results for all parts into account at the same time. Despite the fact that the model is decomposed into sub-parts, the relevant size of the model that is used for the search at the highest pyramid level is not reduced. Hence, the present invention does not suffer the speed limitations of a reduced number of pyramid levels that prior art methods have.

SUMMARY OF THE INVENTION

This invention provides a system and method for object recognition that is robust to partial occlusion, clutter, and nonlinear illumination changes, and recognizes the object even when it is transformed by a perspective or a more general deformation.

The present invention includes a method for recognizing a model object in an image under general nonlinear deformations, comprising the steps of:

(a) acquiring in electronic memory an image of the model object;

(b) transforming the image of the model object into a multi-level representation consistent with a recursive subdivision of a search space, said multi-level representation including at least the image of the object;

(c) generating at least one precomputed model of the model object for each level of discretization of the search space, said precomputed model consisting of a plurality of model points with corresponding direction vectors, said model points and direction vectors being generated by an image processing operation that returns a direction vector for each model point;

(d) generating a subdivision of said plurality of model points into a plurality of parts, where a deformed instance of the model is represented by transforming the parts;

(e) acquiring in electronic memory a search image;

(f) transforming the search image into a multi-level representation consistent with the recursive subdivision of the search space, said multi-level representation including at least the search image;

(g) performing an image processing operation on each transformed image of the multi-level representation that returns a direction vector for a subset of model points within said search image that corresponds to the range of transformations for which the at least one precomputed model should be searched;

(h) computing a global match metric that combines the results of a local metric, where for the local metric the parts of the model are searched in a restricted range of transformations close to the precomputed model and the maximal fit of each part is taken as the contribution of said part to the global match metric;

(i) determining those model poses whose match metric exceeds a user-selectable threshold and whose match metric is locally maximal, and generating a list of instances of the at least one precomputed model in the coarsest discretization level of the search space from the model poses;

(j) computing a deformation transformation that describes the local displacements of the parts;

(k) tracking said instances of the at least one precomputed model in the coarsest discretization level of the search space through the recursive subdivision of the search space until a finest level of discretization is reached;

(l) computing at each level the respective deformation transformation and propagating said deformation transformation to the next level; and (m) providing the model pose and the deformation transformation of the instances of the model object on the finest level of discretization.

Preferred embodiments according to the invention are specified in the dependent claims.

The present invention includes a system for recognizing a model object in an image under general nonlinear deformations which includes:

(a) means for acquiring in electronic memory an image of the model object;

(b) means for transforming the image of the model object into a multi-level representation consistent with a recursive subdivision of a search space, said multi-level representation including at least the image of the object;

(c) means for generating at least one precomputed model of the model object for each level of discretization of the search space, said precomputed model consisting of a plurality of model points with corresponding direction vectors, said model points and direction vectors being generated by an image processing operation that returns a direction vector for each model point;

(d) means for generating a subdivision of said plurality of model points into a plurality of parts, where a deformed instance of the model is represented by transforming the parts;

(e) means for acquiring in electronic memory a search image;

(f) means for transforming the search image into a multi-level representation consistent with the recursive subdivision of the search space, said multi-level representation including at least the search image;

(g) means for performing an image processing operation on each transformed image of the multi-level representation that returns a direction vector for a subset of model points within said search image that corresponds to the range of transformations for which the at least one precomputed model should be searched;

(h) means for computing a global match metric that combines the results of a local metric, where for the local metric the parts of the model are searched in a restricted range of transformations close to the precomputed model and the maximal fit of each part is taken as the contribution of said part to the global match metric;

(i) means for determining those model poses whose match metric exceeds a user-selectable threshold and whose match metric is locally maximal, and generating a list of instances of the at least one precomputed model in the coarsest discretization level of the search space from the model poses;

(j) means for computing a deformation transformation that describes the local displacements of the parts;

(k) means for tracking said instances of the at least one precomputed model in the coarsest discretization level of the search space through the recursive subdivision of the search space until a finest level of discretization is reached;

(l) means for computing at each level the respective deformation transformation and propagating said deformation transformation to the next level; and (m) means for providing the model pose and the deformation transformation of the instances of the model object on the finest level of discretization.

The model of the object to be recognized consists of a plurality of points with a corresponding direction vector, which can be obtained by standard image processing algorithms, e.g., by edge or line detection methods. At the time of model generation the point set is divided into a plurality of parts. These parts can move with respect to their original location during the search, thus allowing the model to flexibly change its shape. In a preferred embodiment, each part of the model consists of only one model point. In another preferred embodiment, each part consists of several nearby points that are kept rigid with respect to each other.

During the search, the original model is instantiated for, e.g., a general affine pose range. At each position, the instance of the model is deformed by independently transforming each part in a close range transformation. For each part, a match metric is calculated at each transformation in this restricted range. In a preferred embodiment, the match metric is the normalized dot product of the direction vectors of the part and the preprocessed search image. The match metric of the whole model is the normalized sum of the maximally fitted parts at their deformed transformation. In a preferred embodiment, parts whose score with respect to the match metric is below a threshold are assumed to be occluded and therefore discarded in further processing. The transformation of the part where the match metric is maximal determines the deformation of that part with respect to the original location. This displacement is used for computing a deformation model that is selected beforehand. In a preferred embodiment the model of nonlinear deformation is a perspective transformation. In another embodiment it is, e.g., a spline function or another method known in the art for interpolating or approximating a point set. Once this transformation function is computed, the deformation of the found image region can be inverted to generate a rectified image.

BRIEF DESCRIPTION OF THE DRAWINGS

The invention will be more fully understood from the following detailed description, in conjunction with the accompanying figures, wherein.

DETAILED DESCRIPTION

The present invention provides a method for deformable object recognition that is robust to occlusion, clutter, and nonlinear contrast changes.

Figure 5:
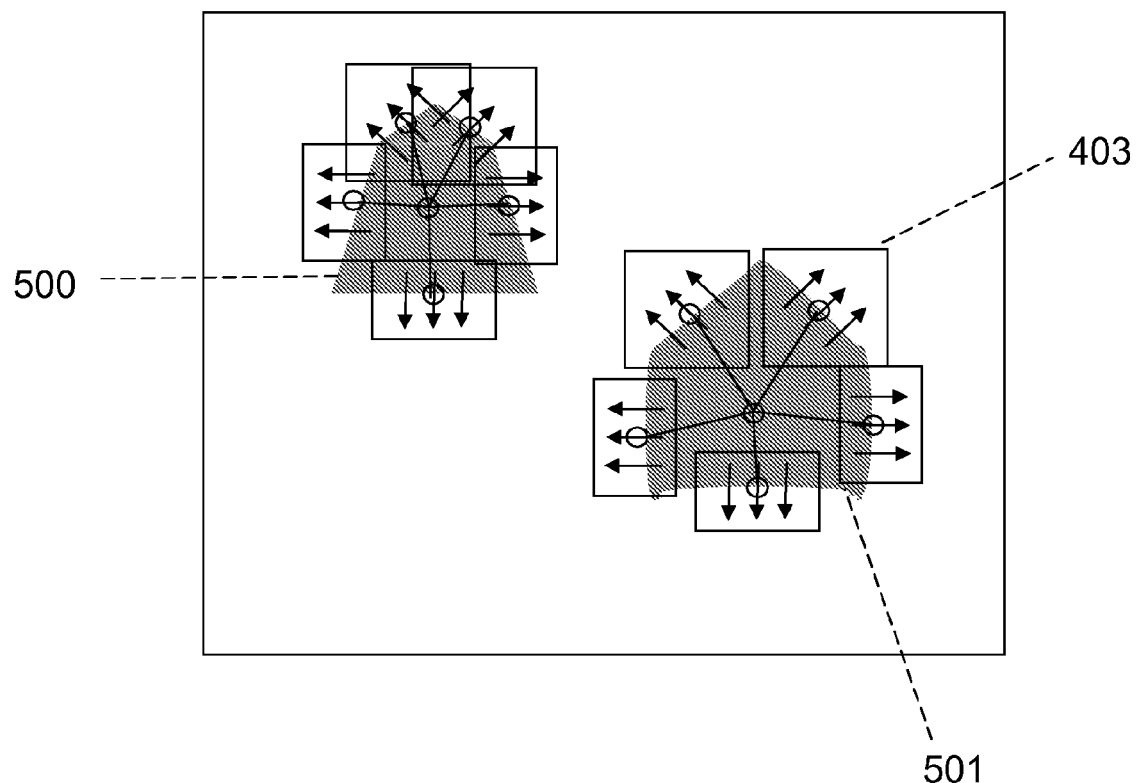
FIG. 5 shows a current image which contains two deformed instances of the object and the result of object detection by the two found instances of the model.
Figure 6:
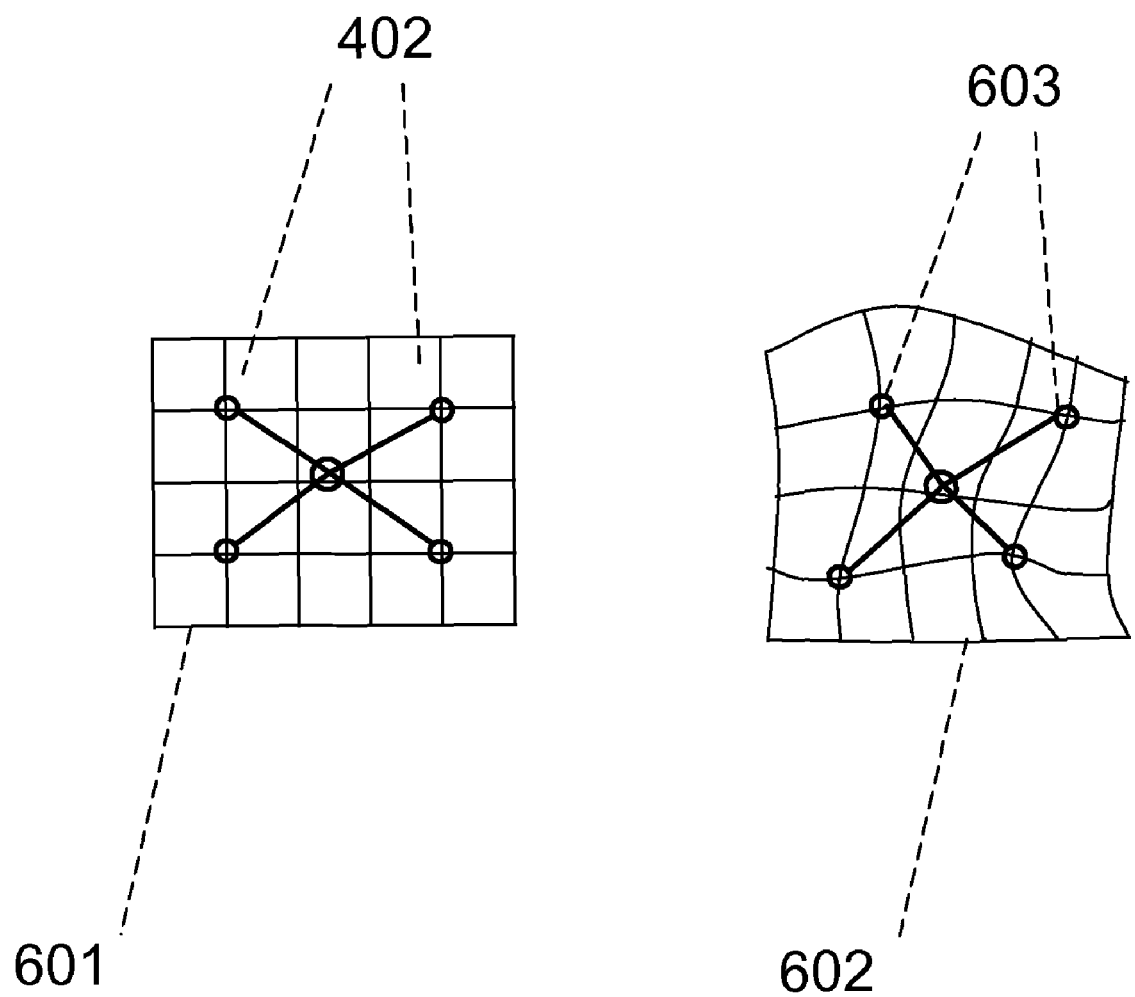
FIG. 6 shows a deformation map between rigid and deformed template that is generated by fitting a deformation function, where the sample points of the deformation mapping are the centers of the parts.
Figure 7:
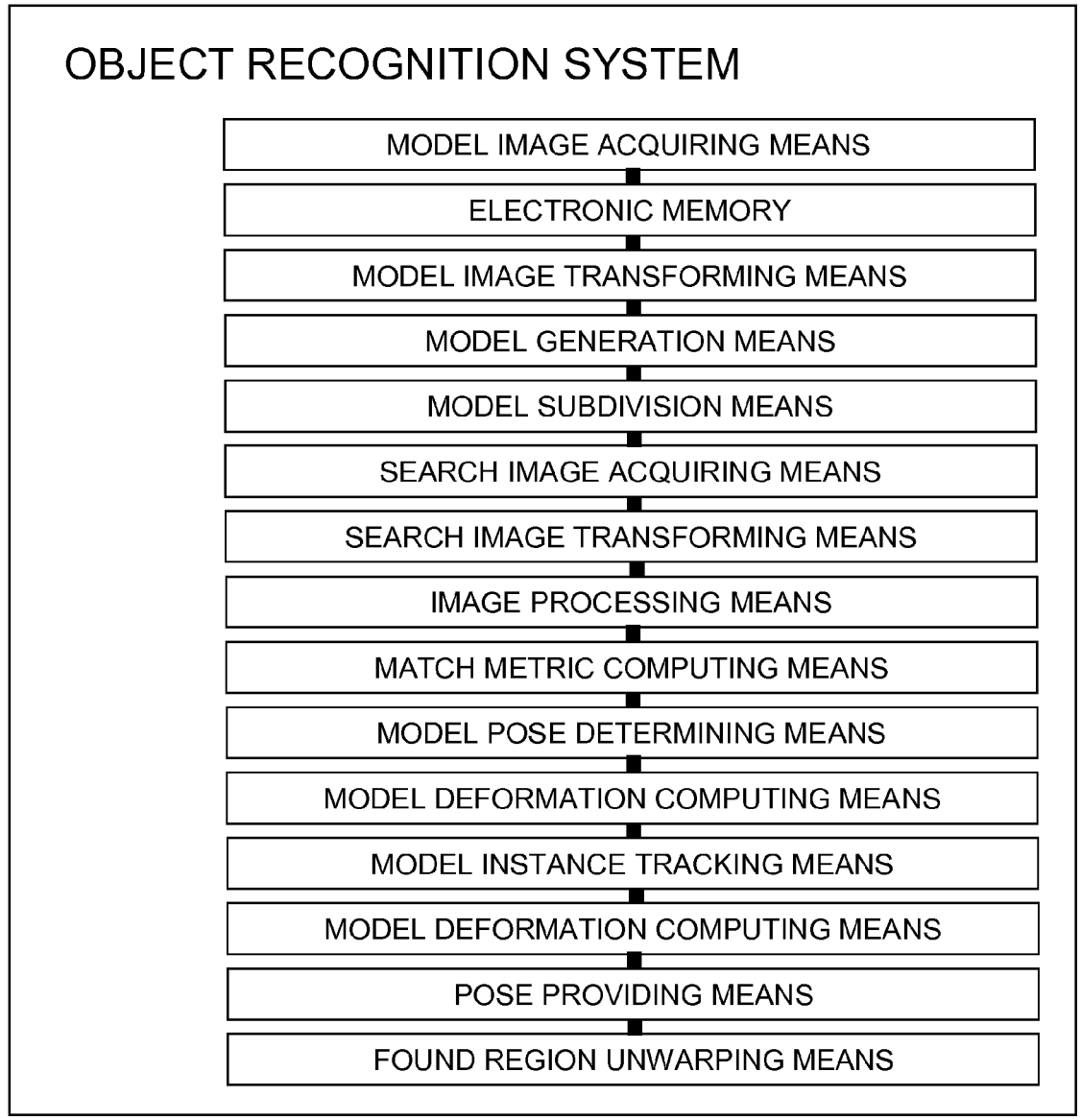
FIG. 7 shows a schematic block diagram of an object recognition system implementing the method of FIGS. 1-6.
Figure 8:
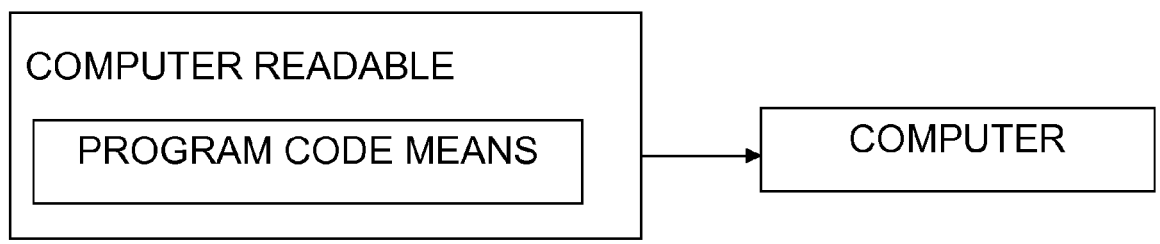
FIG. 8 shows a schematic block diagram of a computer using a computer readable medium to implement the method of FIGS. 1-6.

The present invention also provides an object recognition system shown in FIG. 7 for use with a computer as shown in FIG. 8 to implement the methods described herein in conjunction with FIGS. 1-6.

Figure 1:
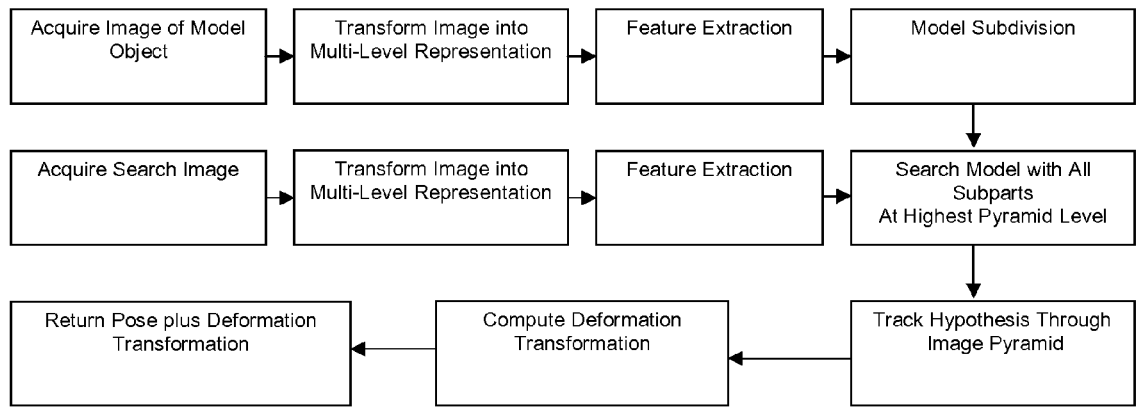
FIG. 1 is a flow chart of a preferred embodiment of the invention showing the steps of the method.
Figure 2:
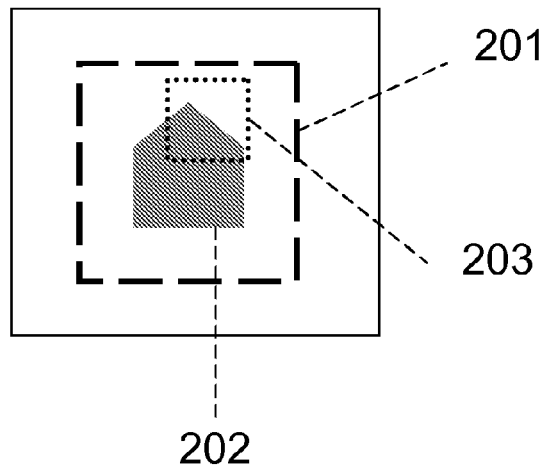
FIG. 2 shows an image of an object and a region of interest around the object for model generation.
Figure 3A:
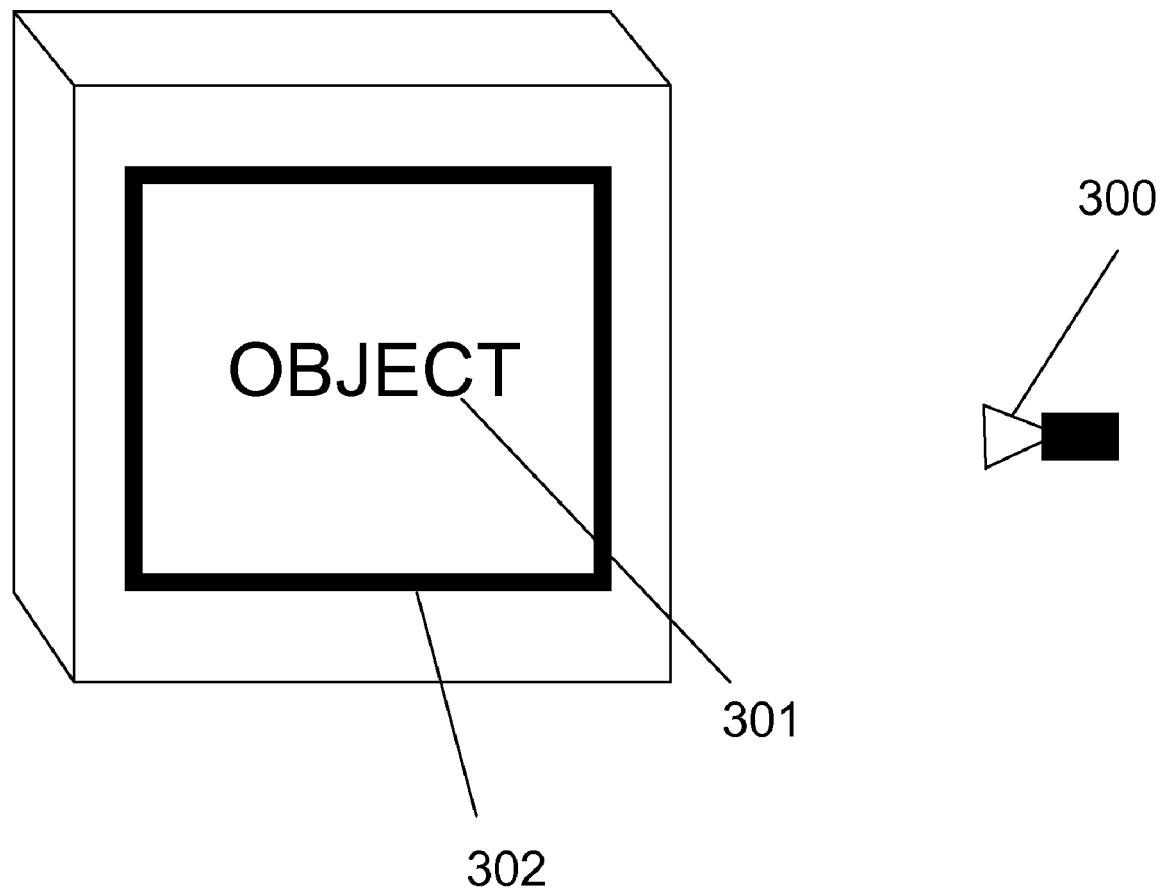
FIG. 3A shows the model generation, where the object is on a planar surface.
Figure 3B:
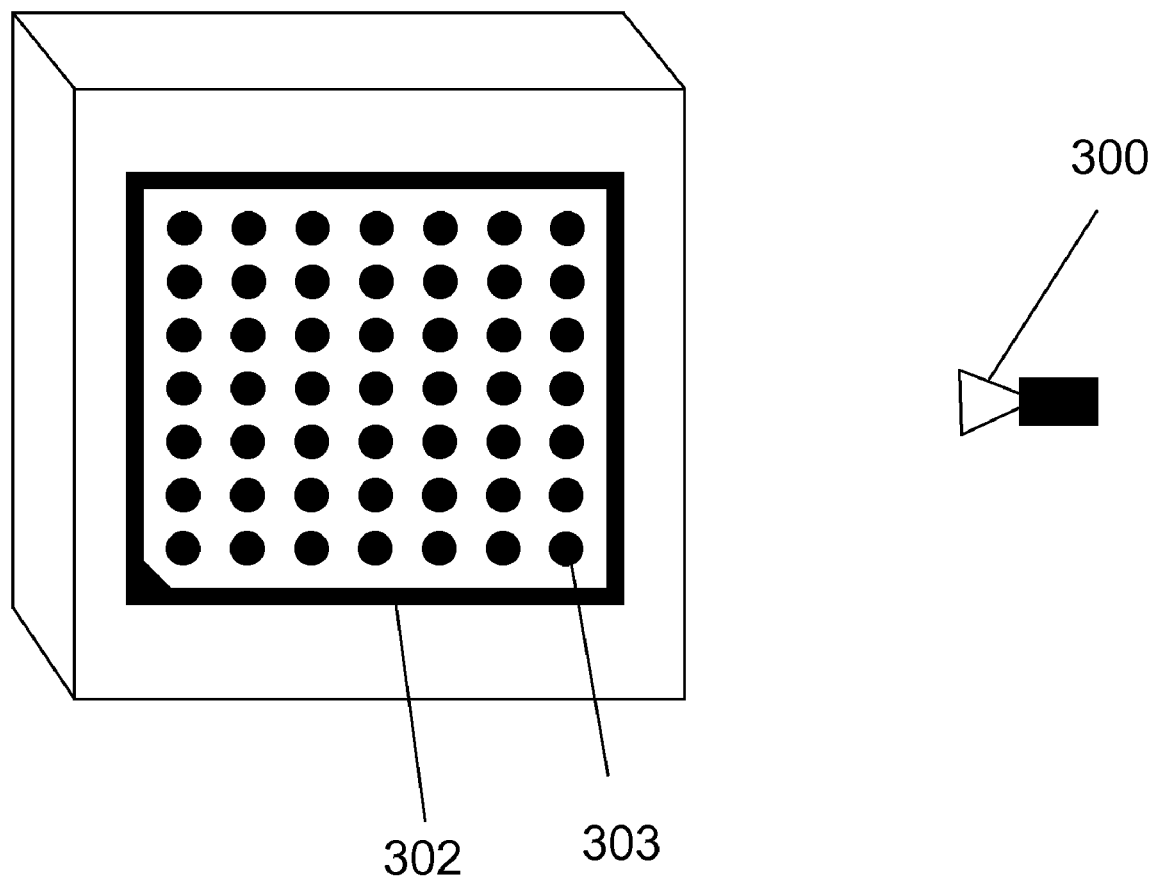
FIG. 3B shows the model generation, where the object is occluded by a calibration plate.

FIG. 1 gives an overview of the steps of the method. The method is divided into an offline phase, where a model of the object is generated, and an online phase, where said model of the object is found in search images. The input for the model generation is a sample image that shows the object in an undeformed way. In FIG. 2, an image of a sample object of a house-like shape 202 is shown. A region of interest 201 restricts the location of the object in the image. Typically, this region is defined by a user of the object recognition system in the offline training phase. If the user of the object recognition system is only interested in rectifying the object later in the search images, sometimes only a small part of the object is of particular interest for the later processing. For instance, in applications where letters must be read from a package, an additional region of interest can be specified that defines the location and size of the region with respect to the model that must later be un-warped 203. While the object detection system uses the information from the complete object, only the part of that object that is of special interest must be rectified. This leads to speed enhancements, particularly when only a small part of an object is of interest.

For some applications, the user of the object recognition system is interested in the pose of the object, e.g., in pick and place applications for a robot manipulator. However, the region of interest 201 in the image specifies only the location and size of the object in the image. To determine the metric pose of the object, the internal geometry of the imaging device must be provided to the system. The internal geometry of an imaging device 300 (see FIG. 3A) is typically described by its focal length, the location of the principal point in the image, the size of a pixel element in row and column direction, and a distortion coefficient that models pin-cushion or barrel-shaped distortions caused by the lens. To control a robot manipulator with an object recognition system, further information is needed like the pose of the camera in the world coordinate system. Having the location of the camera and robot manipulator in the world coordinate system allows converting poses from the local coordinate system of the camera into the coordinate frame of the robot manipulator and back. Hence pose information in the camera coordinate system can be converted into control tasks, which the robot manipulator can execute directly. The internal and external parameters of a camera can be determined beforehand by various methods known in prior art (see e.g. MVTec Software GmbH, HALCON 8.0 Documentation, Solution Guide II-F, 3d Machine Vision, 2007).

Once these parameters are determined, the relative pose of the region of interest of the model object 301 in the camera coordinate system is needed for the relative pose estimation of the object (see FIGS. 3 and 4). This is important as usually no a priori metric information is available of the object that is imaged and it is not possible to say if the object is, e.g., small and near the camera or big, but far away. Here the two situations would result in the same image. The typical way of providing this metric information is to manually specify, e.g., point correspondences between world and image points and to measure their location in both the image and the world, thereby removing the scale ambiguity of the imaging process.

However, this approach is prone to error and makes the use of the object recognition system cumbersome, because providing point correspondences manually is a time-consuming task. In a preferred embodiment an already measured planar calibration plate 303 is placed over the object of interest and an image showing the calibration plate is acquired (see FIG. 3B). In this schematic view, the calibration plate 303 contains dark circles that define point correspondences. As the size of the calibration plate and the exact metric location of the points are known, the relative pose of the calibration plane can be determined in the camera coordinate system. Then the calibration plate is removed from the object and a second image showing the object at the same location as the calibration plate is acquired (see FIG. 3A). Because the pose of the calibration plate and the pose of the object for the model generation are the same in both the world and the image, the corresponding pose for the object is determined automatically. The region of the calibration plate 303 is directly used in combination with the image of the object for the model generation. This procedure eases the use of the system, as the user does not need to specify the region of the object in the image anymore. Instead he once places the calibration grid on the object, takes an image and then removes the calibration plate and takes a second image of the object. In a further preferred embodiment the rectangular shape of the region of interest that is defined by the calibration plate can be manually adjusted to fit arbitrarily shaped planar objects, instead of the rectangular shape of the calibration grid. Here the point correspondences that are given by the calibration plate can still be used as long as the region of interest that defines the model is in the same plane as the calibration plate. Furthermore, it is straightforward to extend this procedure even for non-planar objects by one of ordinary skill in the art. Here, one would, e.g., in a loop collect the region of interest and the metric information of planar substructures and assemble these parts into a 3D description of the object.

Figure 4A:
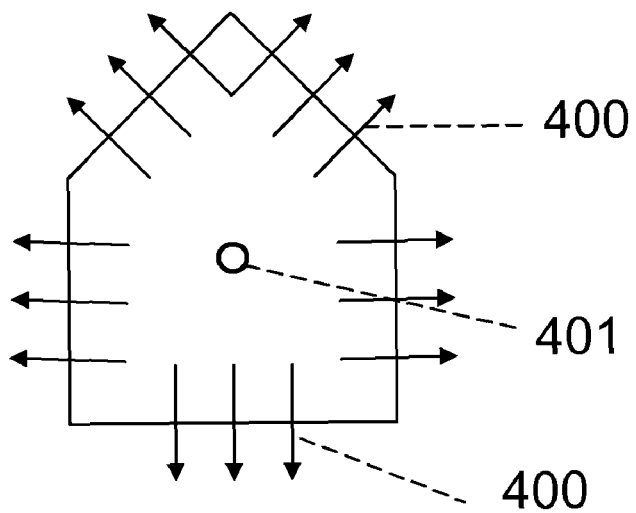
FIG. 4A is a set of model points that are generated by an edge filter.

The object recognition system transforms the image of the model generation into a recursive subdivision that contains a smoothed and sub-sampled version of the original image. In the following exposition, recursive subdivision, multi-level representation, and image pyramid is used synonymously. In a preferred embodiment, the recursive subdivision is a mean image pyramid. In another preferred embodiment, a Gaussian image pyramid is applied. The same multi-level representation is generated from the region of interest that defines the location of the model. For each multi-level representation the model generation extracts edge points from said region of the image. A result of edge detection is shown in FIG. 4A. Here, the edge detection extracts not only the location, but also the direction of strong contrast changes. The used edge detection is for instance a Sobel filter or a Canny edge detection filter or any other filter known in the art that extracts directed feature points from an image. The present invention is not limited to edge features but could easily be extended to line features or interest point features by a person of ordinary skill in the art. For the sake of clarity, we restrict further discussion to edge points. The small arrows 400 of FIG. 4A represent the location and the direction of the edge points. The extracted edge points are transformed into a model coordinate frame (depicted by a circle 401) and are saved into memory for each of the model points. Hence, the system obtains a geometric description of the imaged object.

The model coordinate frame 401 defining the origin of the model is typically calculated by taking the center of gravity of the point set. The orientation of the coordinate frame is the same as that of the image. Accordingly, the transformation that maps the model coordinate frame into the template image coordinate frame is a simple translation. In a further preferred embodiment, the user provides a different point for the origin of the model. A typical application for manually setting the origin point is that a position on the object that is of special interest in the application should be found, e.g., the center of a borehole of a metallic part. Obviously, this location typically does not correspond to the center of the model. This central model point is of special interest, because the object recognition system returns the pose for this point, since it is assumed by the system that it represents the location of the object.

By applying general affine transformation mappings from the model coordinate frame to an image coordinate frame, different instances of the model can be projected into an image. However, the model instances so far are rigid.

Figure 4B:
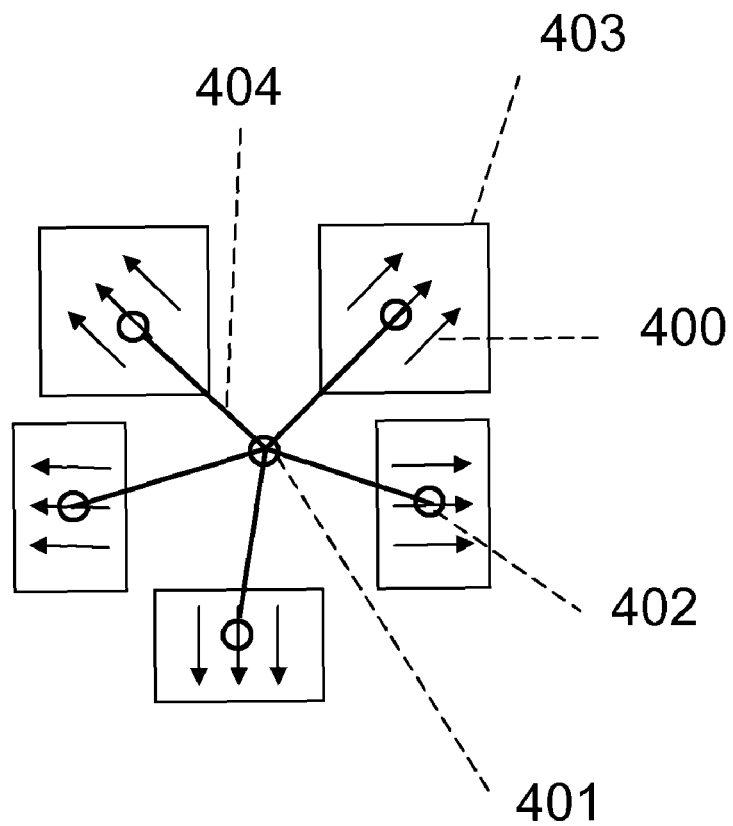
FIG. 4B shows a sample subdivision of the model points into a plurality of parts, where the center of the model and the relative translation of the parts to the model center is depicted.

To allow for successive nonlinear model deformations the plurality of edge points are organized into sub-pluralities. By locally transforming the sub-pluralities, the spatial relation with respect to each other sub-plurality changes, leading to a nonlinear shape change of the whole object. Here, the local transformation that is applied on each sub-plurality is a sufficiently small affine transformation, or a subset thereof like a rigid transformation or a translation. A sample subdivision of a model is shown in FIG. 4B. The input for the part generation is the set of edge points 400 that were generated beforehand by the feature extraction.

Once the edge points are extracted, the task of the part generation is to group these points into spatially coherent structures 403. Here the invention assumes that spatially correlated structures stay the same even after a deformation. One aspect of the invention is to do this clustering manually. Here the user selects parts that he knows will remain similar into a group. Another embodiment of the invention performs the clustering by automatic methods. One straightforward method is to set a fixed subdivision over the model and take points in one cell of the subdivision to belong to one part. Another approach is to calculate a neighborhood graph of the model points and select a fixed number of nearest points to be in one part. Another method consists in applying a spectral decomposition of the point set. Examples of these spectral decomposition methods are known in the art as, e.g., k-means clustering or normalized cuts (Jianbo Shi and Jitendra Malik. Normalized cuts and image segmentation. *In IEEE Conference on Computer Vision and Pattern Recognition*, pp. 731-737, 1997). It is important to note that the invention is not restricted to the fact that the different sub-pluralities are disjunctive sets. In a preferred embodiment a sub-plurality is generated for each point and its nearest neighboring points. Independently of the subdivision method used, the model points are divided into n parts each containing $k_i$ model points. To speed up later calculations, a data structure is used that contains for each part the index $n_{ij}$ of the model points that it contains. Here, the index i ranges from 1 to n and defines which part is selected, and j goes from 1 to $k_i$ and defines the points of the part. If for instance each part has the same number of model points a matrix representation is used, where each row defines the part, each column the index in that part.

Figure 4C:
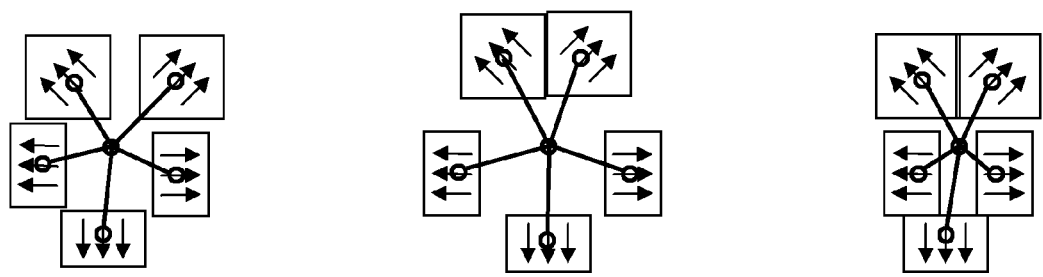
FIG. 4C shows typical deformations of the model that are due to local nearby movements of the parts.

Having defined such a subdivision, centers 402 of each part 403 are calculated, e.g., by taking the center of gravity of the respective point set. The transformation 404 between the center of the parts and the origin of the model 401 is saved in the model. Therefore, the relative location of the center of the parts is converted into a transformation like a Euclidian transform that brings the coordinate frame of the model to the coordinate frame of the part. These transformations allow converting the positions and directions of the model points from the coordinate frame of the part to the coordinate frame of the model and back. Changing the relative transformations 404 between model and part, e.g., by small movements along the x- and y-axis or rotations around the center of the part, allows for instantiation of deformed versions of the model. Some sample deformations, which are due to small translations in x and y direction, are depicted in FIG. 4C.

An aspect of the invention is to extend the method and system that is known for detecting rigid objects in images in the presence of partial occlusion, clutter and nonlinear illumination changes (see U.S. Pat. No. 7,062,093).

The directed point set of the model is compared to a dense gradient direction field of the search image. Even with significant nonlinear illumination changes that propagate to the gradient amplitude the gradient direction stays the same. Furthermore, a hysteresis threshold or non-maximum suppression is completely avoided in the search image, resulting in true invariance against arbitrary illumination changes. Partial occlusion, noise, and clutter lead to random gradient directions in the search image. These effects lower the maximum of the score with respect to this metric, but do not alter its location. A semantic meaning of the score value is the fraction of matching model points.

The idea of the efficient search is that the object recognition system instantiates globally only general affine transformations or a subset thereof. By allowing local movements of the parts and taking the maximal response as the best fit, the search implicitly evaluates a much higher class of nonlinear transformations. This is depicted in FIG. 5 where a search image with two deformed instances of the model is shown. On the left a perspectively transformed instance 500 of the model is shown. On the right a more complicated arbitrary deformation 501 is depicted. As shown in the figure, the locally adapted parts 403 approximate the objects in the search image. Changing the local transformation between the rigid and locally adapted position of the parts allows representing a very large variety in the model appearance.

An important observation is that by transforming an image into a pyramid representation only a small deformation at each level must be compensated. For instance, even if an object has a complicated deformation on the lowest pyramid level, the appearance at the highest pyramid level is not changed significantly. On the other hand, if the object has one big deformation, it can be compensated at the highest level. In the present invention, the deformation is recursively propagated down the image pyramid. At each level only relatively small changes in the appearance of the object take place, if all higher level deformations have been compensated in higher pyramid levels.

Therefore, the present invention extends said metric for deformable object detection by splitting the search metric into a global $s_g$ and local part $s_l$. For the sake of clarity, we present the formulas for translation only, meaning that a score is calculated for each row r and column c only. It is straightforward to extend it for general affine parameters. As described above, the model is divided into n parts each containing $k_i$ model points.

The global metric is defined as:

$$s_g(r, c) = \frac{1}{n}\sum_{i=1}^{n} s_i(r, c, i),$$

meaning it is a combination of the score values of the local matches that is calculated for each part defined by the index i.

The local match metric is defined as:

$$s_l(r, c, i) = \max_{T_l} \frac{1}{k_i} \sum_{j=1}^{k_i} \frac{\langle T_l(d_{ij}^m), d_{(r+T_l(r_{ij}),c+T_l(c_{ij}))}^s \rangle}{\|d_{ij}^m\| \cdot \|d_{(r+T_l(r_{ij}),c+T_l(c_{ij}))}\|}.$$

Here, ij pair defines the index that indicates which model point is in which part, where each part has $k_i$ points. The $r_{ij}$ and $c_{ij}$ are the row and column displacements of the respective model point in the model coordinate system. The local transformations $T_l$ are used to change the shape of the model. Typically, these are Euclidean transformations that have a small effect, e.g., 1 pixel translation in each direction. The superscripts m and s define whether d is the direction vector of the model or of the respective location in the search image.

At each possible pose location, each part has as an independent score value that is given by a metric similar to that described in U.S. Pat. No. 7,062,093. For each part, said metric is evaluated for a range nearby its original affine location. The maximum score in the local neighborhood is taken as the best fit of that part. The global metric is obtained by summing up the results of the local metrics normalized by the number of model points in each part. Various different metrics can be derived from said metric without departing from the scope of the invention. A variation of the invention is that for each part a threshold can be set that must be exceeded by that part. Otherwise, it is assumed that said part is occluded and is consequently discarded from further processing.

$$s_g(r, c) = \frac{1}{n}\sum_{i=1}^{n} \vartheta(s_l(r, c, i)), \text{ where } \vartheta(x) = \begin{cases} x : x \geq \text{threshold} \\ 0 : x < \text{threshold} \end{cases}.$$

Another preferred embodiment is when the size of the parts differs. Here, one weights the influence of each part by the amount of model points that it includes.

The global score value for a set of general affine transformations allows for the determination of where the object is approximately located, even when the exact deformation is not known. A further variation is to discard polarity information from the local score metric in order to achieve invariance against contrast reversals. This is done by using the absolute value of the sum or the sum of the absolute value of the normalized dot product of the direction vectors of the model and image points in the local metric.

By having obtained the best match for each part, not only a score value but an estimate for the deformation is obtained. These are the local transformations $T_l$ that define the maximum local score. After having a local displacement for each part, a respective nonlinear model is fitted. Even for locations where no model points are located, a smooth deformation can be calculated. One sample deformation is shown in FIG. 6. The center of the parts 402 are displaced to a nearby location 603. A nonlinear transformation is fitted to these points that transform the original rigid space (schematically depicted as the grid 601) transform into a deformed one 602. This is a well known problem in the art and various solutions from function interpolation and approximation have been proposed. Here, one aspect of the invention is to use only the local displacement of each part as function points and fit, e.g., a perspective transformation for each point. This can for instance be done by the direct linear transform method (Hartley and Zisserman 2000). If the model is assumed to be rigid, directly the 3D pose can be fitted by a robust iterative nonlinear minimization like the Levenberg-Marquardt algorithm. For the case of a deformable model, a spline function is defined by the displacements. This spline function is for instance a B-spline function or a thin-plate spline function. The coefficients for these functions are calculated by direct methods. However, if, for instance, the thin-plate spline function is used, very big liner systems must be inverted to obtain the coefficients of the warp. Therefore, in another preferred embodiment a harmonic interpolation method is used that is defined by the deformation of the model points. Here, the displacements of the model points are inserted into two images that describe the warping in row and column direction. Then, for regions where no model points are located a deformation is inpainted by a method called harmonic inpainting (see Aubert, G and Kornprobst, P., Mathematical Problems in Image Processing: Partial Differential Equations and the Calculus of Variations (second edition), volume 147 of Applied Mathematical Sciences. Springer-Verlag. 2006). To make the warp very smooth, the deformation is propagated back into the original region of the model points. Hence, not only an interpolating, but an approximating function is obtained. The advantage of this method is that the runtime depends only linearly on the size of the object and not, e.g., cubically on the number of anchor points as for thin-plate splines.

Often, particularly for severe deformations, it is impossible to extract the deformation in one step. Given a deformation mapping, all the model points and the respective directions are transformed. With this transformed model each sub-plurality of the model is now independently searched again for a local displacement. This gives a loop of determining small displacements and fitting a model that is evaluated until convergence is reached. Typically convergence is tested by checking whether the displacements become smaller than a predefined threshold.

For the defined range of global instances that exceed a threshold and are local maxima, an object hypothesis with the location, score and deformation information is put into a list so that they are further examined in lower pyramid levels. In a preferred embodiment, not only a threshold on the global score value but a maximum number of hypotheses that are generated on the highest pyramid level are set. Here, all the hypotheses are sorted according to their score value and only a fixed number of best matching candidates are put into the list of hypothesis that are further processed.

Once an exact location and deformation for a model on a particular pyramid level is determined, the deformation must be propagated down the pyramid to the next pyramid level. This is important so that only a small search range for the local deformations must be evaluated on the lower level. In a preferred embodiment, the original affine model from the lower level is transformed by recursive subdivision into the higher pyramid level. The already extracted deformation of the higher level is applied onto the model and the now transformed model from the lower level is transformed back into its original pyramid level. The search on this level starts with an instance of the model that is transformed according to the deformation of the higher pyramid level.

This tracking of the hypothesis down the image pyramid is done until the lowest pyramid level is reached. On the lowest pyramid level, the displacements are determined with even a higher resolution than the original image. Therefore, the parts are instantiated at a sub-pixel precise location and corresponding maximal edge amplitudes are determined in the image. Here the displacements of the part are no longer defined by the gradient direction, but by the gradient amplitude. Following the above approach the small displacements are used to fit a deformation function up to a very high precision. Once the object is found on the lowest level the location, the pose and the deformation function are returned. Furthermore, the value of the global score function is returned to give the user a measure how well the object was found.

While several particular embodiments of the invention have been described in detail, various modifications to the preferred embodiments can be made without departing from the scope of the invention. Accordingly, the above description is not intended to limit the invention except as indicated in the following claims.

The invention claimed is:

1. A method for recognizing a model object in images, under general nonlinear deformations, comprising the steps of:
   (a) acquiring in electronic memory an image of the model object;
   (b) transforming the image of the model object into a multi-level representation consistent with a recursive subdivision of a search space, said multi-level representation including at least the image of the object;
   (c) generating at least one precomputed model of the model object for each level of discretization of the search space, said precomputed model consisting of a plurality of model points with corresponding direction vectors, said model points and direction vectors being generated by an image processing operation that returns a direction vector for each model point;
   (d) generating a subdivision of said plurality of model points into a plurality of parts, where a deformed instance of the model is represented by transforming the parts;
   (e) acquiring in electronic memory a search image;
   (f) transforming the search image into a multi-level representation consistent with the recursive subdivision of the search space, said multi-level representation including at least the search image;
   (g) performing an image processing operation on each transformed image of the multi-level representation that returns a direction vector for a subset of image points within said search image that corresponds to the range of nonlinear transformations for which the at least one precomputed model should be searched;
   (h) computing a global match metric for each affine model pose at the coarsest discretization level of the search space, said global match metric combining the results of a local metric, where for the local metric the parts of the model are searched in a restricted range of local affine transformations close to the precomputed model and the maximal fit of each part is taken as the contribution of said part to the global match metric;
   (i) determining those model poses whose match metric exceeds a user-selectable threshold and whose match metric is locally maximal, and generating a list of instances of the at least one precomputed model in the coarsest discretization level of the search space from the model poses;
   (j) computing a nonlinear deformation transformation that describes the local displacements of the parts;
   (k) tracking said instances of the at least one precomputed model in the coarsest discretization level of the search space through the recursive subdivision of the search space until a finest level of discretization is reached;
   (l) computing at each level the respective nonlinear deformation transformation and propagating said deformation transformation to the next level; and
   (m) providing the nonlinear deformation transformation of the instances of the model object on the finest level of discretization.

2. The method of claim 1, wherein the location of the parts is determined at a resolution that is higher than the finest discretization level.

3. The method of claim 2, wherein additionally to the user-selectable threshold only up to a user-selectable number maximum of the best instances of hypothesis are generated into the list of possible matches on the coarsest discretization level.

4. The method of claim 3, wherein the score for the local match metric of each part must exceed a local user-selectable threshold, otherwise the part is assumed to be occluded and discarded from further processing.

5. The method of claim 4, wherein each part is composed of a number of points where the subdivision generates overlapping point sets.

6. The method of claim 4, wherein each part is composed of a number of points where the point sets are disjunctive sets.

7. The method of claim 6, wherein the subdivision is done using k-means clustering.

8. The method of claim 6, wherein the subdivision is done using normalized cuts.

9. The method of claim 4, wherein the computed nonlinear deformation transformation is a perspective transformation.

10. The method of claim 4, wherein the model generation additionally receives as input metric information about the internal geometry of the imaging device and the model and the computed nonlinear deformation transformation is a 3D pose.

11. The method of claim 4, wherein the computed nonlinear deformation transformation is a thin-plate spline.

12. The method of claim 4, wherein the computed nonlinear deformation transformation is a cylindrical transformation.

13. The method of claim 4, wherein the computed nonlinear deformation transformation is a harmonic interpolation.

14. The method of claim 4, wherein the sum of the normalized dot product of the direction vectors of the transformed model part and the search image is used in the local score metric.

15. The method of claim 4, wherein the absolute value of the sum of the normalized dot product of the direction vectors of the transformed model part and the search image is used in the local score metric.

16. The method of claim 4, wherein the sum of absolute value of the normalized dot product of the direction vectors of the transformed model part and the search image is used in the local score metric.

17. A system for recognizing an object in images under general nonlinear deformations, consisting of:
   (a) means for acquiring in electronic memory an image of the model object;
   (b) means for transforming the image of the model object into a multi-level representation consistent with a recursive subdivision of a search space, said multi-level representation including at least the image of the object;

(c) means for generating at least one precomputed model of the model object for each level of discretization of the search space, said precomputed model consisting of a plurality of model points with corresponding direction vectors, said model points and direction vectors being generated by an image processing operation that returns a direction vector for each model point;

(d) means for generating a subdivision of said plurality of model points into a plurality of parts, where a deformed instance of the model is represented by transforming the parts;

(e) means for acquiring in electronic memory a search image;

(f) means for transforming the search image into a multi-level representation consistent with the recursive subdivision of the search space, said multilevel representation including at least the search image;

(g) means for performing an image processing operation on each transformed image of the multi-level representation that returns a direction vector for a subset of image points within said search image that corresponds to the range of nonlinear transformations for which the at least one precomputed model should be searched;

(h) means for computing a global match metric for each affine model pose at the coarsest discretization level of the search space, said global match metric combining the results of a local metric, where for the local metric the parts of the model are searched in a restricted range of local affine transformations close to the precomputed model and the maximal fit of each part is taken as the contribution of said part to the global match metric;

(i) means for determining those model poses whose match metric exceeds a user-selectable threshold and whose match metric is locally maximal, and generating a list of instances of the at least one precomputed model in the coarsest discretization level of the search space from the model poses;

(j) means for computing a nonlinear deformation transformation that describes the local displacements of the parts;

(k) means for tracking said instances of the at least one precomputed model in the coarsest discretization level of the search space through the recursive subdivision of the search space until a finest level of discretization is reached;

(l) means for computing at each level the respective nonlinear deformation transformation and propagating said deformation transformation to the next level; and (m) means for providing the nonlinear deformation transformation of the instances of the model object on the finest level of discretization.

18. A non-transitory computer-readable medium having computer-executable instructions for performing the method of claim 1.

19. A system for recognizing an object in images under general nonlinear deformations comprising an imaging device, a memory and a processor, the memory adapted to acquire an image of the model object, the processor adapted to:

(a) transform the image of the model object into a multi-level representation consistent with a recursive subdivision of a search space, said multi-level representation including at least the image of the object;

(b) generate at least one precomputed model of the model object for each level of discretization of the search space, said precomputed model consisting of a plurality of model points with corresponding direction vectors, said model points and direction vectors being generated by an image processing operation that returns a direction vector for each model point;

(c) generate a subdivision of said plurality of model points into a plurality of parts, where a deformed instance of the model is represented by transforming the parts;

(d) acquire in electronic memory a search image;

(e) transform the search image into a multi-level representation consistent with the recursive subdivision of the search space, said multi-level representation including at least the search image;

(f) perform an image processing operation on each transformed image of the multi-level representation that returns a direction vector for a subset of model image points within said search image that corresponds to the range of nonlinear transformations for which the at least one precomputed model should be searched;

(g) compute a global match metric for each affine model pose at the coarsest discretization level of the search space, said global match metric combining the results of a local metric, where for the local metric the parts of the model are searched in a restricted range of local affine transformations close to the precomputed model and the maximal fit of each part is taken as the contribution of said part to the global match metric;

(h) determine those model poses whose match metric exceeds a user-selectable threshold and whose match metric is locally maximal, and generating a list of instances of the at least one precomputed model in the coarsest discretization level of the search space from the model poses;

(i) compute a nonlinear deformation transformation that describes the local displacements of the parts;

(j) track said instances of the at least one precomputed model in the coarsest discretization level of the search space through the recursive subdivision of the search space until a finest level of discretization is reached;

(k) compute at each level the respective nonlinear deformation transformation and propagating said deformation transformation to the next level; and (l) provide the nonlinear deformation transformation of the instances of the model object on the finest level of discretization.

* * * * *